//  United States Patent  
Krywitsky

(10) Patent No.: US 7,686,037 B2  
(45) Date of Patent: *Mar. 30, 2010

(54) QUICK DISCONNECT VALVE ASSEMBLY

(75) Inventor: Lee A. Krywitsky, Calgary (CA)

(73) Assignee: Hiltap Fittings, Ltd., Calgary, Alberta (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/465,528

(22) Filed: Aug. 18, 2006

(65) Prior Publication Data

US 2006/0278839 A1 Dec. 14, 2006

Related U.S. Application Data

(62) Division of application No. 10/970,147, filed on Oct. 21, 2004, now Pat. No. 7,117,892.

(60) Provisional application No. 60/608,808, filed on Sep. 10, 2004, provisional application No. 60/527,450, filed on Dec. 5, 2003, provisional application No. 60/514,365, filed on Oct. 24, 2003.

(51) Int. Cl.
 *F16L 37/32* (2006.01)
 *F16K 27/00* (2006.01)
(52) U.S. Cl. .............. 137/614.04; 137/614.06; 251/149.6
(58) Field of Classification Search .............. 251/149.5, 251/149.6, 367, 149.7; 137/614.04, 614.03, 137/614.05, 614.02, 614.06
See application file for complete search history.

(56) References Cited

U.S. PATENT DOCUMENTS

| 179,947 | A | 7/1876 | O'Neil |
| 641,028 | A | 1/1900 | Meehan |
| 923,545 | A | 6/1909 | Madison |
| 1,021,203 | A | 3/1912 | Matchette |
| 1,419,066 | A | 6/1922 | Ratigan |
| 2,333,496 | A | 11/1943 | Townhill et al. |
| 2,340,965 | A | 2/1944 | Kiesel |
| 2,512,041 | A | 6/1950 | Steele |
| 2,543,590 | A | 2/1951 | Swank |

(Continued)

FOREIGN PATENT DOCUMENTS

CA 2354467 1/2002

OTHER PUBLICATIONS

OEM Mass Flowmeters, TSI Incorporated, 1998.

(Continued)

*Primary Examiner*—John Bastianelli
(74) *Attorney, Agent, or Firm*—Workman Nydegger

(57) ABSTRACT

A quick disconnect valve assembly includes first and second valve elements configured to releasably engage each other. Each valve element includes a housing that defines a valve seat and a fluid passageway. A plunger is disposed within each housing and arranged for selective engagement with a corresponding valve seat. Each plunger is biased into a sealing engagement with the valve seat by a resilient element disposed within the housing. Consequently, the fluid passageway of each valve element is closed off when the first and second valve elements are separated from each other. When the valve elements are engaged, the respective biases associated with the plungers counteract each other to the extent that each plunger is lifted off the corresponding valve seat and fluid communication is established between the respective fluid passageways of the first and second valve elements.

17 Claims, 5 Drawing Sheets

U.S. PATENT DOCUMENTS

| | | | |
|---|---|---|---|
| 2,571,236 A | | 10/1951 | HaMilton |
| 2,679,407 A | | 5/1954 | Badger |
| 2,707,390 A | | 5/1955 | Beretish |
| 2,737,401 A | | 3/1956 | Lindsay |
| 3,454,024 A | | 7/1969 | McCullough |
| 3,474,827 A | | 10/1969 | Rosell |
| 3,542,047 A | | 11/1970 | Nelson |
| 3,664,634 A | | 5/1972 | Guertin et al. |
| 3,766,947 A | | 10/1973 | Osburn |
| 3,777,771 A | | 12/1973 | De Visscher |
| 3,821,970 A | | 7/1974 | Affa |
| 3,949,787 A | | 4/1976 | Milo |
| 4,010,633 A | | 3/1977 | Hasha |
| 4,019,371 A | | 4/1977 | Chaplin et al. |
| 4,133,347 A | | 1/1979 | Mercer |
| 4,184,516 A | | 1/1980 | Oesterritter et al. |
| 4,269,230 A | | 5/1981 | Pepper |
| 4,271,865 A | | 6/1981 | Galloway et al. |
| 4,461,065 A | | 7/1984 | Futterer |
| 4,510,969 A | | 4/1985 | Rodth |
| 4,567,924 A | | 2/1986 | Brown |
| 4,614,201 A | | 9/1986 | King et al. |
| 4,626,746 A | | 12/1986 | Zaderej |
| 4,646,773 A | | 3/1987 | Klop et al. |
| 4,696,326 A | | 9/1987 | Sturgis |
| 4,739,799 A | | 4/1988 | Carney et al. |
| 4,815,491 A | * | 3/1989 | Prikle ........................ 251/149 |
| 4,827,960 A | | 5/1989 | Nitzberg et al. |
| 4,827,977 A | * | 5/1989 | Fink, Jr. ................ 137/614.04 |
| 4,896,688 A | * | 1/1990 | Richards et al. ........ 137/614.04 |
| 4,901,751 A | | 2/1990 | Story et al. |
| 4,909,280 A | | 3/1990 | Friedrich et al. |
| 4,909,545 A | | 3/1990 | Hohol |
| 4,926,680 A | | 5/1990 | Hasha et al. |
| 5,009,252 A | * | 4/1991 | Faughn .................. 137/614.04 |
| 5,170,659 A | | 12/1992 | Kemp |
| 5,209,105 A | | 5/1993 | Hasha et al. |
| 5,297,574 A | | 3/1994 | Healy |
| 5,316,033 A | | 5/1994 | Schumacher et al. |
| 5,404,909 A | | 4/1995 | Hanson |
| 5,494,074 A | * | 2/1996 | Ramacier et al. ....... 137/614.04 |
| 5,520,418 A | | 5/1996 | Burke |
| 5,529,085 A | | 6/1996 | Richards et al. |
| 5,699,822 A | | 12/1997 | Bodhaine |
| 5,704,659 A | | 1/1998 | Lunder |
| 5,816,298 A | * | 10/1998 | Stricklin et al. ........ 137/614.04 |
| 5,826,610 A | | 10/1998 | Bodhaine |
| 5,934,319 A | | 8/1999 | Schumacher |
| 6,000,278 A | | 12/1999 | Hystad |
| 6,029,701 A | | 2/2000 | Chaffardon et al. |
| 6,050,297 A | | 4/2000 | Ostrowski et al. |
| 6,082,392 A | | 7/2000 | Watkins |
| 6,142,194 A | | 11/2000 | McClaran |
| 6,155,294 A | | 12/2000 | Cornford |
| 6,237,631 B1 | * | 5/2001 | Giesler et al. .......... 137/614.04 |
| 6,283,151 B1 | | 9/2001 | Countryman et al. |
| 6,325,092 B1 | * | 12/2001 | Pirkle ...................... 251/149.6 |
| 6,354,564 B1 | | 3/2002 | Van Scyoc et al. |
| 6,375,153 B2 | * | 4/2002 | Smith, III .............. 137/614.04 |
| 6,511,103 B1 | | 1/2003 | Defontaine |
| 6,672,327 B1 | | 1/2004 | Krywitsky |
| 6,899,131 B1 | * | 5/2005 | Carmack et al. ........ 137/614.04 |
| 6,981,513 B2 | | 1/2006 | Krywitsky |
| 7,029,581 B2 | * | 4/2006 | Horan ................... 137/614.04 |
| 7,117,892 B2 | | 10/2006 | Krywitsky |
| 7,152,630 B2 | | 12/2006 | Krywitsky |
| 7,533,694 B2 | | 5/2009 | Krywitsky |
| 2004/0018335 A1 | | 9/2004 | Horan |
| 2004/0188335 A1 | * | 9/2004 | Horan ....................... 210/222 |
| 2006/0289062 A1 | | 12/2006 | Krywitsky |
| 2007/0039657 A1 | | 2/2007 | Krywitsky |
| 2007/0289650 A1 | | 12/2007 | Krywitsky |
| 2008/0202594 A1 | | 8/2008 | Krywitsky |

OTHER PUBLICATIONS

Sima FC2 Induction-based flow meter, www.simaservis.cz, publication date unknown.

Non-Final Office Action dated August 21, 2007, received in U.S. Appl. No. 11/465,384.

Amendment "A" filed February 21, 2008, in U.S. Appl. No. 11/465,384.

International Search Report from PCT/IB2004/003833; dated April 6, 2005, 2 pages.

Written Opinion from PCT/IB2004/003833, dated May 2, 2005, 5 pages.

International Preliminary Report on Patentability from PCT/IB2004/003833, dated April 24, 2006, 6 pages U.S. Appl. No. 12/038,971, filed Feb. 28, 2008, Krywitsky.

U.S. Appl. No. 11/769, 560 filed Jun. 27, 2007, Krywitsky.

U.S. Appl. No. 11/465,570, filed Aug. 18, 2006, Krywitsky.

* cited by examiner

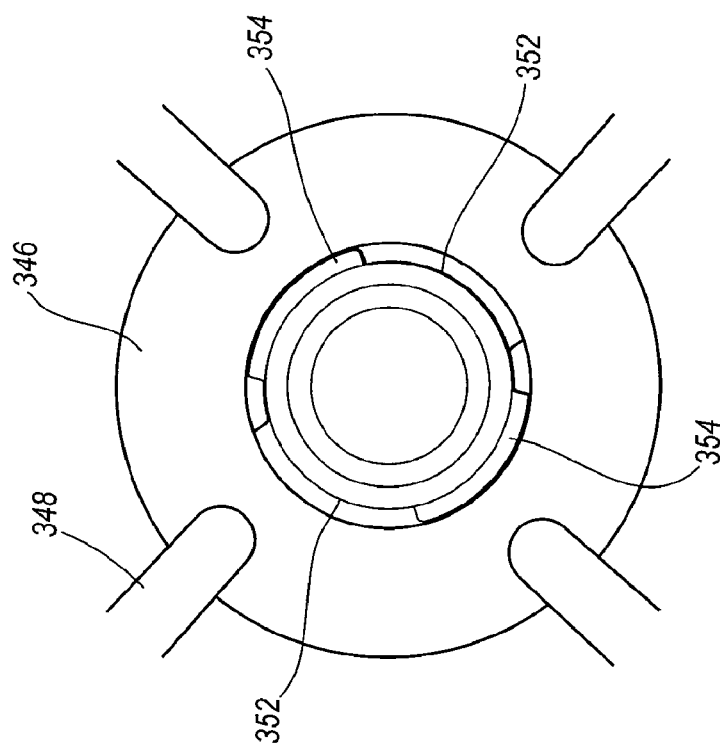
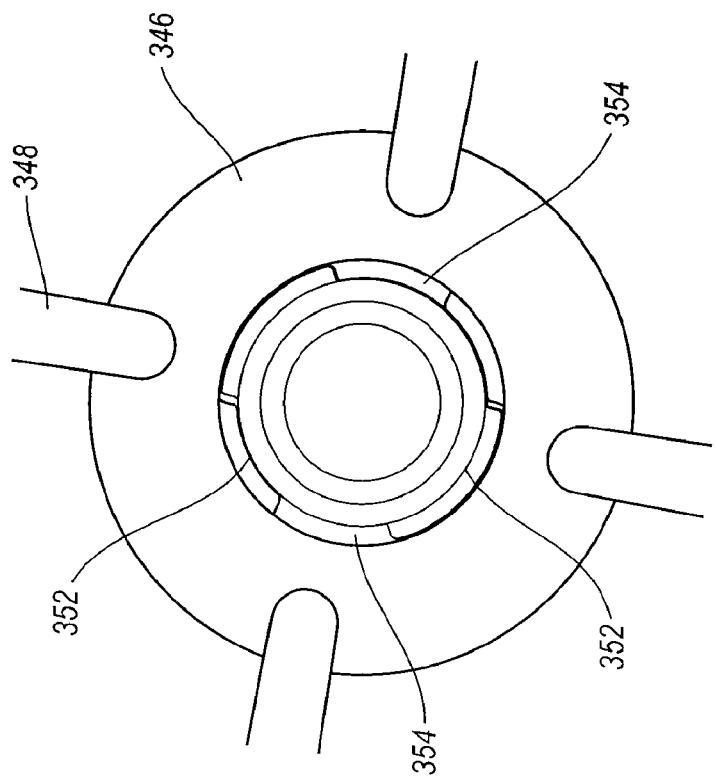
Fig. 4A
Fig. 4B

QUICK DISCONNECT VALVE ASSEMBLY

RELATED APPLICATIONS

This application is a divisional of U.S. Utility application Ser. No. 10/970,147, entitled QUICK DISCONNECT VALVE ASSEMBLY, filed Oct. 21, 2004 now U.S. Pat. No. 7,117,892. This application also claims the benefit of all of the following provisional applications, each of which is incorporated herein in its respective entirety by this reference: U.S. Provisional Patent Application Ser. No. 60/514,365, entitled QUICK RELEASE VALVE ASSEMBLY, filed Oct. 24, 2003; U.S. Provisional Patent Application Ser. No. 60/527,450, entitled QUICK RELEASE VALVE ASSEMBLY, filed Dec. 5, 2003; and, U.S. Provisional Patent Application Ser. No. 60/608,808, entitled QUICK RELEASE VALVE ASSEMBLY, filed Sep. 10, 2004.

BACKGROUND

1. Field of the Invention

This invention relates generally to fluid system components. More particularly, exemplary embodiments of the invention relate to a quick disconnect valve assembly that provides positive, rapid and reliable flow shutoff, as well as rapid establishment of flow.

2. Related Technology

Effective and reliable control of fluid system materials is important in many applications. For example, hazardous materials such as acids, gases and various types of dangerous chemicals can cause significant damage to life and property if not properly contained and controlled by the fluid system. Further, various environmental regulations and rules sharply constrain the permissible amount of certain materials that can be released into the environment. The penalties for violating such rules and regulations can be quite significant in many cases.

Not only must piping systems and components be designed, installed and maintained in such a way as to provide effective and reliable containment of the fluid system material, but such systems and components must also be easy to use and must operate reliably in a wide variety of environments and system conditions. For example, many piping systems experience sustained exposure to extreme heat or extreme cold.

Further, the materials contained within the piping system present challenges as well. For example, high pressure and/or high temperature systems can pose a significant danger to system operators, and others, in the event that a leak develops or there is an uncontrolled release of the system fluid. The piping system and associated components may be exposed to other potentially hazardous conditions as well. One example of this concerns tanker filling operations. In particular, it is not uncommon for a tanker to inadvertently leave the filling point while the fill hose is still connected to the tanker. As the tanker moves away from the fill point, the hose and/or associated connection invariably fails, resulting in the release of system fluid to the atmosphere where the uncontrolled escape of fluid, and/or the fluid itself, can endanger both life and property.

In view of the foregoing, it would be useful to provide a quick disconnect valve assembly that is able to quickly and reliably establish, or shut off, fluid flow in a piping system. The quick disconnect valve assembly should also be constructed to substantially prevent inadvertent disconnection when the associated piping system is pressurized. Further, the quick disconnect valve assembly should prevent, or at least minimize, the escape of system fluid when the quick disconnect valve assembly is connected and disconnected. Finally, embodiments of the quick disconnect valve assembly should be suitable for use in a wide range of applications, including, but not limited to, cryogenic applications.

BRIEF SUMMARY OF AN EXEMPLARY EMBODIMENT OF THE INVENTION

In general, the invention is concerned with fluid system components. In one exemplary embodiment, a quick disconnect valve assembly is provided that includes first and second valve elements configured to releasably engage each other. Each of the valve elements includes a housing that defines a valve seat and a fluid passageway. A plunger is disposed within the housing and arranged for selective engagement with the valve seat. The plunger is biased into a sealing engagement with the valve seat by a resilient element disposed within the housing. In this way, the fluid passageway of each valve element is closed off when the first and second valve elements are separated from each other. Conversely, when the valve elements are engaged with each other, the respective biases associated with the plungers counteracting each other to the extent that each plunger is lifted off the corresponding valve seat and fluid communication is established between the respective fluid passageways of the first and second valve elements.

In this way, embodiments of the invention provide for, among other things, a fail safe quick disconnect valve assembly that minimizes the escape of system fluid when elements of the quick disconnect valve assembly are disengaged from each other, and when the quick disconnect valve assembly is disengaged from other fluid system components. Additionally, the quick disconnect valve assembly can be easily and reliably operated without posing a safety risk to the operator or to property.

BRIEF DESCRIPTION OF THE DRAWINGS

To further clarify the above and other aspects of exemplary embodiments of the present invention, a more particular description of the invention will be rendered by reference to specific embodiments thereof which are illustrated in the appended drawings. It is appreciated that these drawings depict only exemplary embodiments of the invention and are therefore not to be considered limiting of its scope. The invention will be described and explained with additional specificity and detail through the use of the accompanying drawings in which:

FIG. 4A is a top view illustrating an anti-backlash aspect of some embodiments of the invention; and FIG. 4B is a top view providing further details concerning an anti-backlash aspect of some embodiments of the invention.

DETAILED DESCRIPTION OF EXEMPLARY EMBODIMENTS OF THE INVENTION

Exemplary embodiments of the invention are generally concerned with a quick disconnect valve assembly that is able to quickly and reliably establish, or shut off, fluid flow in a piping system. As noted in the following description, embodiments of the quick disconnect valve assembly are constructed to substantially prevent inadvertent disconnection when an associated piping system is pressurized. Further, the quick disconnect valve assembly substantially prevents, or at least minimizes, the escape of system fluid when valve elements of the quick disconnect valve assembly are connected with each other, and disconnected from each other.

The quick disconnect valve assembly is suitable for use in a wide range of applications, and in connection with a variety of system fluids, including, but not limited to, cryogenic and other extreme temperature applications. One example of such an application concerns the transfer and processing of partially or completely liquefied $CO_2$. However, such operating environments are exemplary only and embodiments of the invention may, more generally, be employed in any other environment wherein the functionality disclosed herein would prove useful. For example, embodiments of the invention are suitable for use with fluids such as liquefied natural gas ("LNG"), liquefied propane ("LPG"), refrigerants, and liquid oxygen. Accordingly, the exemplary operating environments, applications and system fluids disclosed herein should not be construed to limit the scope of the invention in any way.

I. Applications and Operating Environments

As noted above, embodiments of the invention are suitable for use in a variety of applications and operating environments. In some cases, embodiments of the invention are employed in connection with a fluid transfer system, exemplified by the fluid transfer system 100 disclosed in FIG. 1. As used herein, "fluid" refers to gases, liquids, solid material suspensions, and combinations of gases and liquids, one example of which is a combination of liquid and vapor phases of a refrigerant or other cryogenic material.

Figure 1:
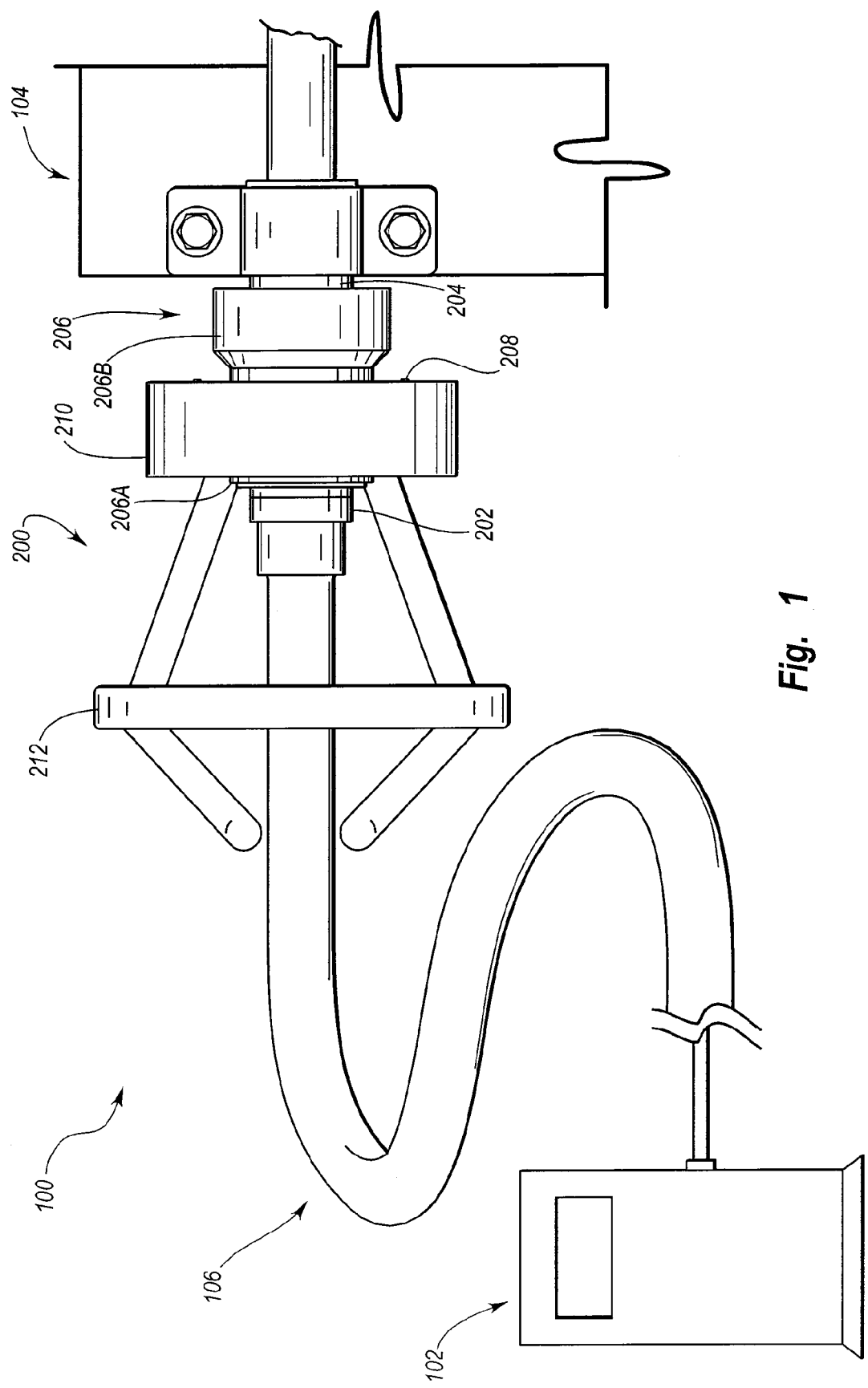
FIG. 1 is a schematic that illustrates aspects of an exemplary operating environment for embodiments of the invention.

As indicated in FIG. 1, the exemplary fluid transfer system 100 includes a fluid source 102, which may additionally or alternatively comprise a fluid destination, configured for fluid communication with a fluid destination 104, which may additionally or alternatively comprise a fluid source, by way of a fluid conduit 106 and a quick disconnect valve assembly 200. The fluid source 102 may comprise a pump, tank or any other system or device from which fluid can be transferred.

In at least some cases, the fluid source 102 comprises a filling or transfer station. Correspondingly, the fluid destination 104 comprises, in some cases, a tanker truck that is configured to receive fluid from the filling or transfer station, and/or to transfer fluid to the filling or transfer station. The fluid conduit 106 by way of which fluid is transferred comprises any material(s) suitable for the intended application. Examples of fluid conduit 106 materials include, but are not limited to, rubber, silicone, polytetrafluoroethylene ("PTFE"), plastic, nylon, and metallic materials.

As suggested above, the quick disconnect valve assembly 200 facilitates selective transfer of fluid between the fluid source 102 and the fluid destination 104. While more detailed information is provided below, the quick disconnect valve assembly 200 generally includes first and second valve elements 202 and 204, respectively, configured to operably engage each other. In some applications, one of the valve elements is permanently attached to, for example, a tanker truck, while the other valve element remains attached to the fluid conduit 106 at the fluid source 102.

The first and second valve elements 202 and 204 are generally configured so that when engaged, such as for effecting a fluid transfer operation, an open fluid passageway is defined through which fluid can flow from one of the valve elements into the other. In order to facilitate such engagement, a sleeve 206 is provided that includes sleeve halves 206A and 206B joined together by a collar 208 that is protected by a shield 210 attached to sleeve half 206A. The first valve element 202 is disposed within the sleeve half 206A while, as suggested earlier, the second valve element 204 comprises an element of a tanker truck fluid transfer system, for example.

In general, the first and second valve elements 202 and 204 are operably engaged when an operator rotates handle 212, attached to shield 210, so that pins (see FIG. 2) disposed on the interior of sleeve half 206B engage corresponding grooves (see FIG. 2) defined on the exterior surface of valve element 204. Due to the angular configuration of the grooves, rotation of the handle 212 in the clockwise direction advances valve element 202 toward valve element 204 until an open fluid passageway is defined through which fluid can flow from one of the valve elements into the other. Separation of the valve elements 202 and 204 from each other and, correspondingly, cessation of flow through and from the valve elements 202 and 204, is accomplished by rotating the handle 212 counterclockwise until the pins disposed on the interior of sleeve half 206B disengage the corresponding grooves defined on the exterior surface of valve element 204.

In the event that excessive force is applied to the quick disconnect valve assembly 200, such as may occur if a tanker truck leaves a filling station prior to normal separation of sleeve half 206B from valve element 204, a sacrificial element (not shown) of the collar 208 fails before damage can occur to the quick disconnect valve assembly 200. In addition, and as discussed in further detail below, exemplary embodiments of the quick disconnect valve assembly 200 are configured so that in the event of a jet effect, such as can occur if one of the valve elements does not fully close when the valve elements are separated, the handle 212 does not rotate and injure the operator.

II. Exemplary Quick Disconnect Valve Assembly

Figure 2:
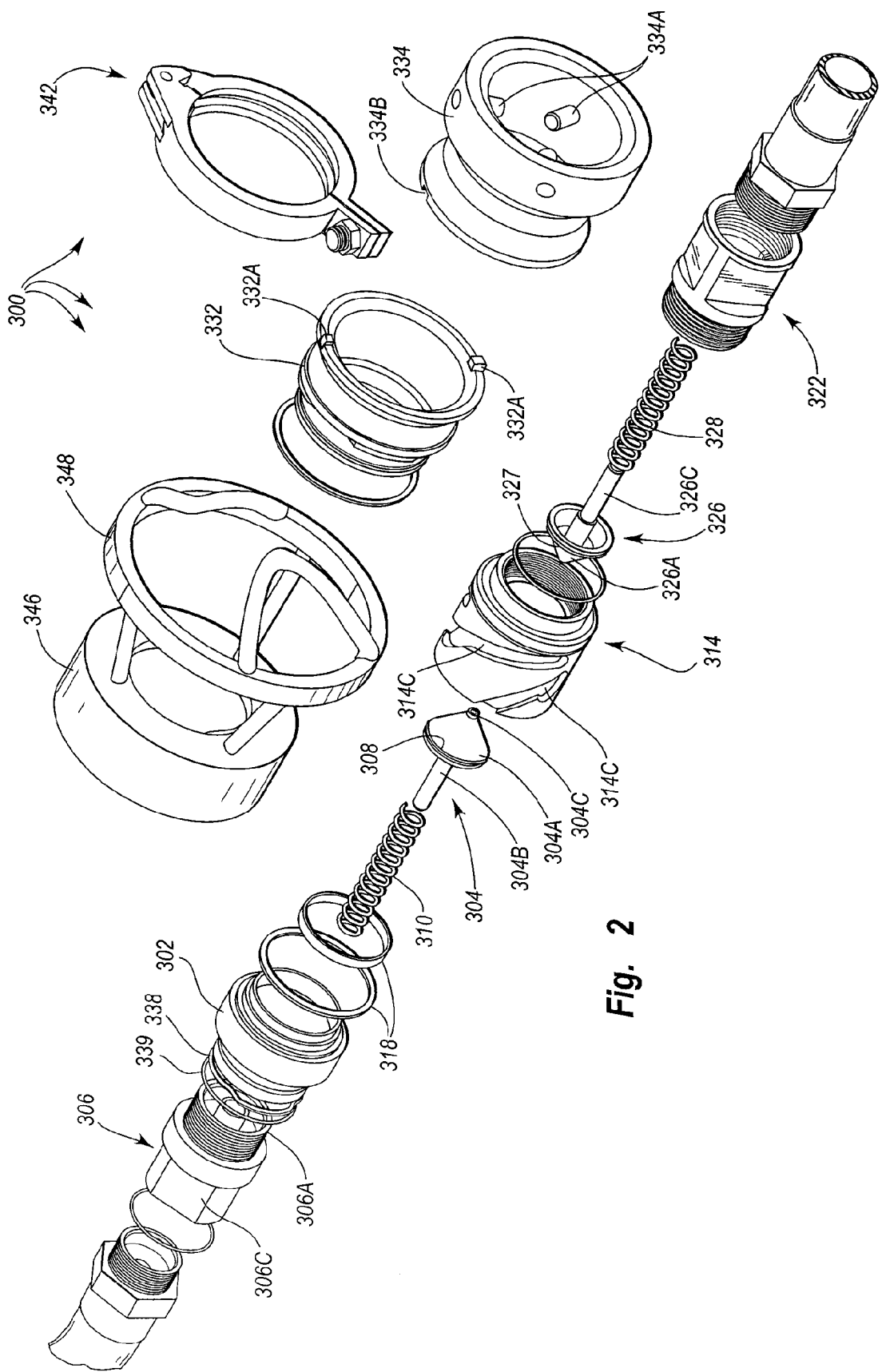
FIG. 2 is an exploded perspective view illustrating aspects of an exemplary implementation of a quick disconnect valve.
Figure 3A:
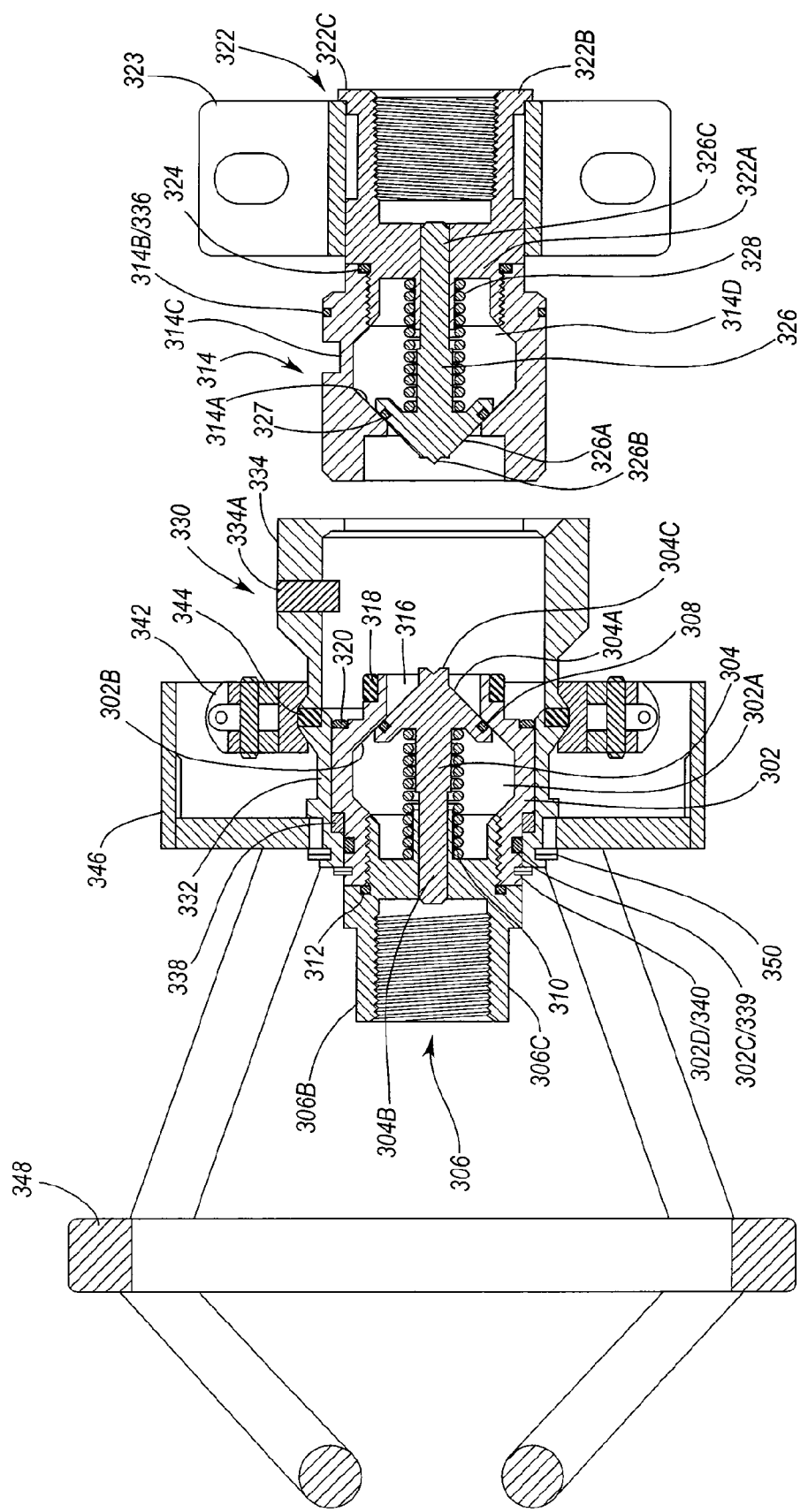
FIG. 3A is a section view indicating the arrangement of various elements of an exemplary implementation of a quick disconnect valve, and illustrating the positioning of various elements when the housings are disengaged.
Figure 3B:
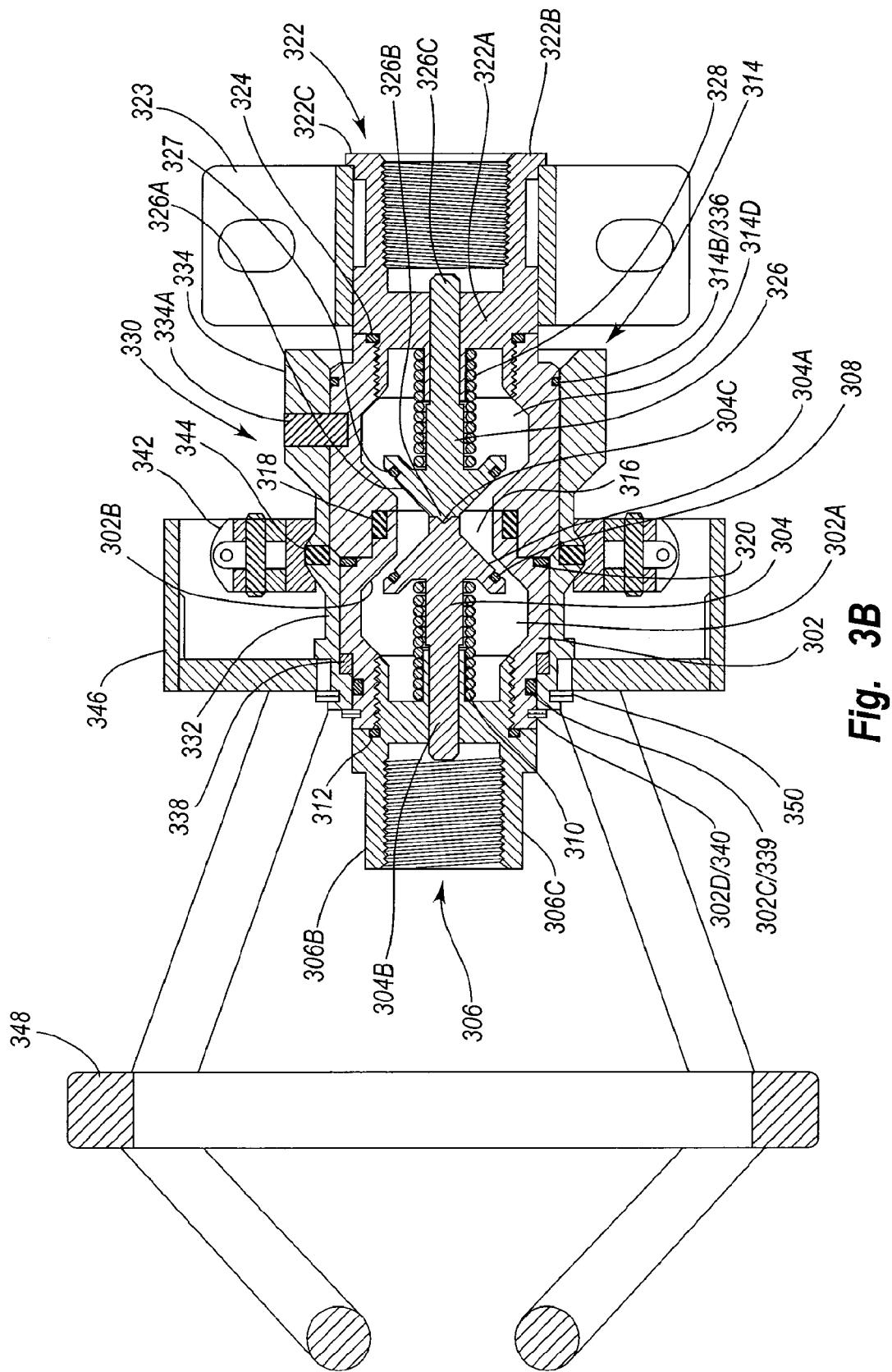
FIG. 3B is a section view indicating the arrangement of various elements of an exemplary implementation of a quick disconnect valve, and illustrating the positioning of various elements when the housings are engaged.

With attention now to FIGS. 2 through 3B, further details are provided concerning the construction of an exemplary quick disconnect valve assembly, denoted generally at 300. Generally, FIG. 2 is an exploded perspective view of the quick disconnect valve assembly 300, indicating the various elements that make up the exemplary quick disconnect valve assembly, and FIGS. 3A and 3B are section views providing further details concerning the arrangement, and operation, of elements of the exemplary quick disconnect valve assembly.

As indicated in FIGS. 2 through 3B, the exemplary quick disconnect valve assembly 300 includes a first housing 302, composed of 316 Stainless Steel or other suitable material(s), that defines a fluid passageway 302A within which is disposed a plunger 304, composed of 360 Brass or other suitable material(s), that is slidingly supported by, and arranged for reciprocal motion relative to, an adapter 306, discussed in further detail below.

The fluid passageway 302A of the first housing 302 is defined, in part, by a seat 302B which has a geometry that, in general, is complementary with the geometry of a plunger face 304A of the plunger 304. Thus, the illustrated plunger face 304A and seat 302B geometries are exemplary and are not intended to limit the scope of the invention Note that combinations including the first housing 302, plunger 304 and seat 302B may also be referred to herein as a "valve element" of the quick disconnect valve assembly 300. The same is likewise true with respect to the second housing and corresponding components.

A sealing element 308 disposed within a groove defined in the plunger face 304A prevents flow through the fluid passageway 302A when the plunger face 304A is in contact with the seat 302B. In some implementations, the sealing element 308 takes the form of a PTFE O-ring, but other sealing element materials and/or configurations may alternatively be employed. As well, some implementations provide for a sealing element in the seat 302B, either in addition to sealing element 308, or as an alternative to the use of sealing element 308. Thus, various numbers, types, and arrangements of sealing elements may be employed.

With continuing reference to the plunger 304, embodiments of the plunger 304 include a plunger shaft 304B that, in some implementations, has a substantially hexagonal cross-section. This type of cross-section allows a small amount of $CO_2$, or other, system fluid to flow through a guide of the adapter 306 within which the plunger shaft 304B is slidingly received. Because any moisture that is present in the system will quickly freeze at liquid $CO_2$ temperatures, approximately −100° F., the hexagonal plunger shaft 304B prevents frozen moisture from jamming the plunger 304, so that the plunger 304 can continue to move. Of course, the hexagonal plunger shaft configuration is exemplary only and, alternatively, the plunger shaft 304B may have a substantially circular cross-section, oval cross-section, or a cross-section of a polygonal shape other than a hexagon.

As indicated in the figures, the plunger 304 further includes a terminal portion 304C configured to interface with a corresponding terminal portion of another plunger. Generally, the terminal portion 304C has a geometry that is complementary with the terminal portion of the opposing plunger, discussed below. In the illustrated implementation, the terminal portion 304C defines a conical recess configured to engage a corresponding conical extension of the opposing plunger. However, the illustrated arrangement may be reversed. As well, some embodiments of the invention provide for substantially flat terminal portions of the plungers.

In yet another alternative, the terminal portion 304C comprises either a cylindrical recess, or a cylinder, while the terminal portion of the other plunger comprises the corresponding complementary geometry. Another embodiment provides for a terminal portion 304C that comprises either a partial spherical recess, or a spherical extension, while the terminal portion of the other plunger comprises the corresponding complementary geometry. In any case, the scope of the invention is not limited to any particular configuration.

It was noted above that the plunger 304 is configured and arranged for reciprocal motion. To this end, a resilient element 310, such as a 316 stainless steel spring for example, is provided that is disposed about the plunger shaft 304B and generally serves to bias the plunger face 304A toward the seat 302B defined by the first housing 302. Further details concerning the operation of the resilient element 310 and plunger 304 are provided below.

With continuing reference to the first housing 302 and associated components, the adapter 306 exemplarily comprises 316 stainless steel, and includes a lower portion 306A configured with external threads to engage corresponding internal threads of the first housing 302. An upper portion 306B of the adapter 306 includes wrench flats 306C to facilitate tightening of the adapter 306 in the first housing 302. Exemplarily, the adapter 306 includes four wrench flats 306C arranged at ninety degrees apart, but other arrangements may be employed instead. Additionally, the upper portion 306B of the adapter 306 is generally configured to mate with a fluid transfer hose or other device and, in some embodiments, comprises a British Standard Pipe ("BSP") connection. A sealing element 312, such as a silicone rubber O-ring for example, substantially prevents leakage from the interface between the adapter 306 and first housing 302.

Attention is directed now to aspects of the exterior of the first housing 302. As indicated in FIGS. 2 through 3B, the exterior of the first housing 302 defines one or more grooves 302C, each of which is configured to receive a corresponding sealing element, such as an O-ring for example. In addition, the illustrated embodiment of the first housing 302 defines at least one groove 302D configured to receive a retaining ring, discussed in further detail below.

With continued attention to FIGS. 2 through 3B, the quick disconnect valve assembly 300 further includes a second housing 314. As the discussion of the configuration and operation of the first housing 302 and associated components is largely germane to the second housing 314, the discussion of the second housing 314 will be primarily confined to selected differences between the two housings.

The second housing 314 is configured to removably receive a portion of the first housing 302 in such a way that a fluid passageway 316 is cooperatively defined by the first housing 302 and the second housing 314. A packet seal and retaining ring 318, exemplarily composed of elastomer, is disposed at the interface of the first housing 302 and the second housing 314 so as to provide for a substantially leakproof connection.

More particularly, the packet seal and retaining ring 318 includes a leading lip that permits the packet seal and retaining ring 318 to self-align when positioned on the first housing 302, and to compensate for thermal shock associated with cryogenic freezing. In addition, the lip is configured and positioned so that expanding liquid $CO_2$, or other system fluid, acts on the lip in such a way that the male sleeve half 334 positively locks with the second housing 314. Specifically, the expanding fluid acts on the lip, pushing the male sleeve half 334 away from the second housing 314, and seating the guide pins 334A in their respective grooves 314C, such as J-grooves, so that the male sleeve half 334 is locked into a safe engagement with the second housing 314.

To further assist in establishing and maintaining a substantially leaktight connection between the first housing 302 and the second housing 314, a sealing element 320 is provided, exemplified by a silicone O-ring, that is interposed between the first housing 302 and the second housing 314, generally as indicated in FIG. 3B.

Similar to the case of first housing 302, an adapter 322 is associated with second housing 314. The adapter 322, exemplarily comprising 316 stainless steel, includes a lower portion 322A that defines external threads configured to engage corresponding internal threads of the second housing 314. An upper portion 322B of the adapter 322 is attached to the lower portion 322A and, exemplarily, defines a female national pipe thread ("FNPT") connection. A substantially leaktight connection is established and maintained between the adapter 322 and the second housing 314 by a sealing element 324, exemplified as a silicone rubber O-ring, and interposed between the adapter 322 and the second housing 314.

As indicated in FIGS. 3A and 3B, as well as FIG. 1, the adapter 322 is, in at least some embodiments, securely clamped to a tanker truck or other vehicle. To this end, a clamp 323 is provided that has a geometry that is complementary with that of the adapter 322. In particular, a lip 322C of the adapter 322 extends out of the clamp as indicated and thus resists any separation of the adapter 322 from the tanker truck or other vehicle or structure to which the adapter 322 is attached. Among other things, this arrangement prevents damage to piping on the truck and, correspondingly, prevents uncontrolled cryogenic releases.

As in the case of the adapter 306, the adapter 322 is configured and arranged to slidingly support a plunger 326 substantially disposed within the second housing 314 and including a plunger face 326A and terminal portion 326B. A resilient element 328 disposed within the housing about the plunger shaft 326C biases the plunger 326 toward a seat 314A defined by the second housing 314 so that a sealing element 327 contacts the seat 314A when the second housing 314 is disengaged from the first housing 302. The terminal portion 326B of the plunger 326 interfaces with the terminal portion 304C of plunger 304, as described above. In at least some embodiments, the plungers 304 and 326 are interchangeable with each other.

In general, and as disclosed in further detail below, the resilient elements 310 and 328, and plungers 304 and 326 are arranged so that each resilient element biases its corresponding plunger in such a way that each plunger moves the opposing plunger off the corresponding seat. Thus, the biases imposed, respectively, by the resilient elements 310 and 328 are offsetting to an extent that both of the plungers 304 and 326 are lifted off their corresponding seats, and remain at static equilibrium, when the first and second housings 302 and 314 are fully engaged with each other. As a result, fluid communication is established between the first and second housings 302 and 314. Correspondingly, when first and second housings 302 and 314 are disengaged from each other, the resilient elements 310 and 328 are free to act upon the plungers 304 and 326, respectively, in such a way that each of the plungers 304 and 326 are biased into a seated position on the corresponding seat. Generally, the resilient elements 310 and 328 are selected such that the seating of the plungers on the seats occurs relatively rapidly, so as to substantially prevent or minimize any escape of system fluid upon disengagement of the first and second housings 302 and 314 from each other.

With continuing reference now to the second housing 314, a groove 314B is defined that is configured to receive a sealing element, as discussed in further detail below. Additionally, a plurality of grooves 314C are defined in the exterior of the second housing 314 and are configured and arranged to receive corresponding structure of a sleeve 330, discussed below. In at least some implementations, at least a portion of the grooves 314C substantially describes a "J," or other functionally equivalent configuration, arranged about the circumference, or a portion thereof, of the second housing 314 so that the second housing 314 cannot be readily disengaged from the aforementioned sleeve 330 when the system is pressurized. In some exemplary implementations, the second housing 314 defines three grooves 314C. More generally however, the number, arrangement, orientation, and configuration of the grooves 314C may be selected as desired. In one alternative implementation, the second housing 314 includes a plurality of guide pins configured and arranged to engage corresponding grooves defined by the sleeve 330.

With continuing reference to the second housing 314, the geometry of the exemplary grooves 314C is such as to allow the plungers 304 and 326 to remain closed until the guide pins 334A, discussed below, are engaged with the angled portion of the grooves 314C. Among other things, this arrangement permits vectoring of the force of engagement on the angled portion of the grooves 314C, rather than requiring the operator to overcome the force inside the hose behind the plunger 326, which force could be as high as 100 pounds, or more. Moreover, the angled portion of the grooves 314C is stepped so that, through a ninety degree turn, the substantially greatest force is approximately located near the middle of the twist, where the operator has the most leverage.

In addition, implementation of the grooves 314C in the illustrated "J" configuration is useful for other reasons as well. For example, it sometimes occurs that a plunger is stuck open, which may be likely due to the nature of liquid $CO_2$ or other materials present in the fluid transfer system, such as in the fluid passageway 302A of the first housing 302 and/or the fluid passageway 314D of the second housing 314. Specifically, moisture, such as may be present in the system, expands at about seven percent and can fill the void of any tolerances present between the outside diameter of the plunger shaft and the inside diameter of the guide wherein the plunger shaft is received.

In the event a plunger sticks, the liquid $CO_2$, or other substance, exposed to atmospheric pressure, sublimates. That is, the system fluid moves directly and rapidly from a cryogenic liquid phase to a gas phase. This rapid expansion would ordinarily present a significant danger both to the safety of the operator, as well as to any property in the area. However, the length of the "J" portion of the grooves 314C permits the operator to cycle the male half of the sleeve, discussed below, in an attempt to dislodge the stuck valve, and so that any residual pressure can escape.

Further details are now provided concerning the exemplary sleeve 330. As indicated in the figures, the sleeve 330 includes a female sleeve half 332 and a male sleeve half 334, both of which exemplarily comprise nitrited stainless steel. As suggested above, the male sleeve half 334 includes a plurality of guide pins 334A, each of which is configured to engage a corresponding groove 314C defined by the second housing 314. A sealing element 336, exemplarily a PTFE O-ring, disposed in the groove 314B serves to facilitate a substantially leaktight connection between the engaged second housing 314 and male sleeve half 334.

The male sleeve half 334 further defines a keyway 334B that generally aligns with corresponding integral keys 332A of the female sleeve half 332, as described below. Similar to the case of the male sleeve half, a sealing element 339, exemplarily a PTFE O-ring, disposed in the groove 302C serves to facilitate a substantially leaktight connection between the first housing 302 and female sleeve half 332. In some implementations, the first housing 302 is designed and intended to remain within the female sleeve half 332 at all times, whereas the male sleeve half 334 is, as noted above, intended to selectively engage and disengage the second housing 314.

To further facilitate a secure connection between the first housing 302 and the female sleeve half 332, a wave spring 338 is provided that is interposed between the first housing 302 and female sleeve half 332. In general, the wave spring 338, or comparable structure(s), exerts a reactive force on the first housing 302 and the female sleeve half 332 when compressed as a result of the attachment of the female sleeve half 332 to the first housing 302. In some implementations, the wave spring 338 substantially comprises stainless steel. In addition, a retaining ring 340, made of stainless steel or other material (s) and disposed in groove 302D, aids in the retention and positioning of the female sleeve half 332 relative to the first housing 302.

With continuing attention to the sleeve 330, the female sleeve half 332 and male sleeve half 334 are attached to each other by way of a breakaway collar 342. One or more sealing elements 344, such as O-rings, interposed between the female sleeve half 332 and male sleeve half 334 aid in the control of system fluid leakage from the interface of the female sleeve half 332 and male sleeve half 334.

As indicated in FIGS. 3A and 3B, the breakaway collar 342 is configured to receive corresponding structure of the female sleeve half 332 and male sleeve half 334 so that the female sleeve half 332 and male sleeve half 334 remain in contact with each other. However, the breakaway collar 342 includes one or more sacrificial elements (not shown), or comparable structure(s), designed to fail when a predetermined force is exerted on the quick disconnect valve assembly 300. In this way, serious damage to the quick disconnect valve assembly 300 is avoided.

Protection of the breakaway collar 342 is afforded by a shield 346 that is attached to the female sleeve half 332, and composed of anodized 316 stainless steel. As indicated in the figures, the shield 346 generally extends to the point that the perimeter of the breakaway collar 342 is substantially enclosed by the shield 346.

In order to facilitate selective engagement and disengagement of the male sleeve half 334 with the second housing 314, a handle 348 is provided that is attached to the shield 346. The handle 348 is at least partially retained in position by way of a retaining ring 350. In one implementation, the handle 348 substantially comprises anodized 316 stainless steel, while the retaining ring 350 is composed simply of 316 stainless steel.

As best indicated in FIG. 2, the exemplary handle 348 is implemented with a football-shaped geometry. Among other things, this handle 348 geometry helps to ensure that the handle 348 does not get caught on the side of a tanker truck. In addition, this geometry increases the likelihood that a loose handle 348 will simply bounce off the truck or other structure, rather than getting hung up on the structure. Finally, the handle 348 geometry contributes to a safe work environment since the handle 348 does not include sharp edges, or protruding elements that could injure a worker or property.

Safety measures implemented in connection with embodiments of the invention are not limited to aspects such as the shield 346, discussed above. In particular, and directing attention to FIGS. 4A and 4B, exemplary embodiments of the invention include an anti-backlash feature that vents residual pressure so that a hose attached, for example, to the first housing 302 will not whip around during the release of pressure that attends the disconnection of the first and second housings 302 and 314.

In particular, should one or both of the plungers be stuck open, the first housing 302 to which the handle 348 is attached may twist off rapidly. This is due to the fact that some materials, such as liquid $CO_2$, expand very rapidly under certain conditions. Thus, if the operator were still holding on to the handle 348, the hands and arms of the operator would be rapidly whipped through a 90 degree twist, possibly seriously injuring the operator.

Thus, in the illustrated embodiment, a pair of backlash slots 352 are milled into the first housing 302, and corresponding "swaths" 354 are milled on the inside diameter of the shield 346. As a result of this arrangement, the operator must rotate the sleeve 330, as much as a full 180 degrees, the exemplary back lash slot 352 travel, and then continue to rotate the sleeve 330 with the handle 348 until the guide pins 334A are fully engaged with the grooves 314C. During disconnection, counterclockwise rotation locks up the back lash slots 352 so that, should a violent separation occur, the hose coupling assembly spins, but the handle 348 does not.

III. Operational Aspects of a Quick Disconnect Valve Assembly

As noted earlier, in some exemplary implementations, the second housing 314 of the quick disconnect valve assembly 300 comprises an element of a tanker truck or other mobile fluid source/destination while, on the other hand, the first housing 302 and attached sleeve 330 of the quick disconnect valve assembly 300 comprise elements of a fluid transfer station configured to interact with the tanker truck. When the quick disconnect valve assembly 300 is not in use, such that the guide pins 334A of the male sleeve half 334 are disengaged from the corresponding grooves 314C defined by the second housing 314, each of the resilient elements 310 and 328 is able to act freely on the corresponding plungers 304 and 326. As a result, the plunger faces 304A and 326A are each biased into a "closed" position such that the associated sealing elements 308 and 327 contact the corresponding seats 302B and 314A of the housings 302 and 314. In this way, the fluid passageways 302A and 314D are substantially sealed so that fluid flow through and between the housings 302 and 314 is substantially precluded.

In operation, connection of the first housing 302 with the second housing 314 is commenced by orienting the first housing 302 so that each guide pin 334A of the male sleeve half 334 is positioned to enter a corresponding groove 314C defined by the second housing 314. Clockwise rotation of the handle 348, such as a quarter turn for example, causes the guide pins 334A to travel along and within the respective grooves 314C defined by the second housing 314 until each of the guide pins 334A are located at a predetermined position within a respective groove 314C.

Because each plunger 304 and 326 is biased toward the other by way of a respective resilient element 310 and 328, the plungers 304 and 326 are forced into contact with each other as the guide pins 334A of the male sleeve half 334 engage and travel along the respective grooves 314C defined by the second housing 314. As a result of this contact between the plungers 304 and 326, as well as exertion of the respective biases imposed on the plungers 304 and 326 by the resilient elements 310 and 328, each plunger 304 and 326 is lifted off its corresponding seat 302B and 314A into an "open" position by the other plunger 304 and 326, and fluid communication is established between the respective fluid passageways 302A and 314D of the first and second housings 302 and 314. In this way, fluid flow through and between the housings 302 and 314 is enabled.

Disengagement of the male sleeve half 334 and the second housing 314 enables each of the resilient elements 310 and 328 to act freely on the corresponding plungers 304 and 326. As a result, the plunger faces 304A and 326A are each biased so that the associated sealing elements 308 and 327 contact the corresponding seats 302B and 314A of the housings 302 and 314. In this way, the fluid passageways 302A and 314D are sealed when the first and second housings 302 and 314 are separated from each other. Thus, separation of the first and second housings 302 and 314 from each other, for whatever reason, results in the rapid and positive shutoff of any flow through the fluid passageway 316.

Moreover, because the fluid passageways 302A and 314D have a relatively small volume, the spillage, if any, of any materials remaining in the fluid passageways 302A and 314D after separation of the first and second housings 302 and 314 would be minimal. In this regard, it should be noted that the fluid passageways 302A and 314D, as well as other elements of the quick disconnect valve assembly 300 such as the plungers 304 and 326, may be designed and implemented in such a way as to facilitate minimization of any fluid spillage that might occur at the time of separation of the first and second housings 302 and 314. For example, increasing the size of the plungers 304 and 326 would reduce the volume of the respective fluid passageways 302A and 314D.

As noted earlier, exemplary embodiments of the invention further provide a safety operating feature which is implemented in connection with the breakaway collar 342. In particular, in the event that a force of predetermined magnitude is exerted upon the quick disconnect valve assembly 300, such as could occur, for example, when a truck to which the second housing 314 is attached, pulls away from the loading area where the hose and first housing 302 are located, the female sleeve half 332 and/or male sleeve half 334 will exert a force on the breakaway collar 342 until the sacrificial element implemented within the breakaway collar 342 fails. Because the first housing 302 is received and secured within the female sleeve half 332, separation of the sleeve female sleeve half 332 and male sleeve half 334 from each other likewise results in separation of the first housing 302 and the second housing 314 from each other. Consequently, the plungers 304 and 326 are rapidly urged to the seated position on their corresponding seats 302B and 314A, as described above, so that the quick disconnect valve assembly 300 effectively falls closed.

Thus, embodiments of the invention provide for, among other things, rapid and positive flow shutoff whenever the first and second housings 302 and 314 are separated from each other, whether as a result of rotation of the handle 348 so as to separate the housings 302 and 314, or as a result of situations where the sleeve 330 halves are forcibly separated as a result of the exertion of a predetermined force on the quick disconnect valve assembly 300. Further, such embodiments are likewise effective in containing and controlling any residual or line pressure that may accumulate or persist in portions of the fluid system, either upstream or downstream of the quick disconnect valve assembly, prior to, during, or after disconnection.

The described embodiments are to be considered in all respects only as exemplary and not restrictive. The scope of the invention is, therefore, indicated by the appended claims rather than by the foregoing description. All changes which come within the meaning and range of equivalency of the claims are to be embraced within their scope.

What is claimed is:

1. A valve element comprising:
    a housing defining a seat and a fluid passageway, the housing further having a guide at least partially disposed within the fluid passageway so that fluid flowing through the fluid passageway flows around an exterior surface of the guide, the guide comprising an internal channel having a first geometric cross-sectional shape;
    a plunger disposed within the housing and arranged for reciprocal movement within the housing so that the plunger is able to selectively engage the seat, the plunger including a plunger face configured to cooperatively engage with a corresponding plunger face of a second plunger, and the plunger including a plunger shaft slideably received within the internal channel of the guide and arranged for reciprocal movement within the internal channel of the guide, the plunger shaft having a second geometrical cross-sectional shape that is different from the first geometric cross-sectional shape of the internal channel of the guide, wherein the first geometric cross-sectional shape of the guide and the second geometric cross-sectional shape of the plunger shaft cooperate to allow fluid to flow through the internal channel of the guide between an internal surface of the guide and an external surface of the plunger shaft; and
    a resilient element positioned at least partially around the guide and being configured and arranged to bias the plunger into a sealing engagement with the seat so that the fluid passageway is substantially sealed where no offsetting force is present, and the resilient element further configured and arranged to be susceptible to application of an offsetting force adequate to move the plunger off the seat and open the fluid passageway.

2. The valve element as recited in claim 1, wherein the plunger shaft has a polygonal cross-section.

3. The valve element as recited in claim 1, wherein the plunger includes a substantially conical face configured to engage the seat.

4. The valve element as recited in claim 1, wherein sealing engagement of the plunger with the seat is facilitated by way of a sealing element arranged for contact with the plunger and with the seat.

5. The valve element as recited in claim 4, wherein the sealing element comprises an O-ring carried by the plunger.

6. The valve element as recited in claim 1, wherein the housing further includes an adapter configured for fluid communication with the fluid passageway.

7. The valve element as recited in claim 1, wherein the housing defines a plurality of grooves, at least a portion of each of the grooves being substantially J-shaped.

8. The valve element as recited in claim 7, wherein the plurality of grooves are defined on an outer circumferential surface of the housing.

9. The valve element as recited in claim 7, wherein the plurality of grooves are angled, such that the housing is arranged to engage a mating portion and draw closer to the mating portion by rotating with respect thereto.

10. The valve element as recited in claim 1, wherein the first geometric cross-sectional shape of the plunger shaft and the second geometric cross-sectional shape of the guide are configured to allow at least some cryogenic fluid to pass between said plunger shaft and said guide.

11. A valve element, comprising:
    a first valve element that includes:
    a housing defining a fluid passageway, a seat configured for sealing said fluid passageway, and a plunger guide;
    a plunger slideably received within said plunger guide and arranged for reciprocal movement within said housing, wherein said plunger has a plunger face configured for sealing engagement with said seat of said housing; and
    a resilient element arranged so that when said first valve element is engaged to a second valve element having a respective plunger, said plunger of said first valve element biases into engagement with said plunger of said second valve element to reside in an equilibrium position where said fluid passageway of said first valve element is in fluid communication with a fluid passageway of a housing of said second valve element; and
    a coupling member attached to said housing of said first valve element, said coupling member being arranged to attach to a coupling member releasably attached to said housing of said second valve element;
    a breakaway collar arranged to releasably join said coupling member attached to said housing of said first valve element to said coupling member releasably attached to said housing of said second valve element; and
    a handle at least indirectly attached to said coupling member attached to said housing of said first valve element.

12. A valve element, comprising:
    a housing defining a fluid passageway, a valve seat, and a plunger guide, said plunger guide being positioned within said fluid passageway so that fluid flowing through said fluid passageway flows around an exterior surface of said plunger guide, said plunger guide having an opening extending therethrough, said opening within said guide having a substantially uniform geometric cross-sectional shape;
a plunger within said fluid passageway, said plunger including:
  a plunger face, said plunger face having a base and a terminal tip, wherein said plunger face has a substantially triangular cross-sectional shape between said terminal tip and said base; and
  a plunger shaft directly attached to said base of said plunger face, said plunger shaft being slideably received within said opening of said plunger guide, said plunger shaft having a substantially uniform geometric cross-sectional shape that is different from said geometric cross-sectional shape of said plunger guide, wherein said geometric cross-sectional shape of said plunger shaft and said geometric cross-sectional shape of said plunger guide allow at least some cryogenic fluid to pass between said plunger shaft and said plunger guide;
a resilient member disposed around said plunger guide and engaging said base of said plunger face, said resilient member being arranged to bias said plunger into a sealing engagement with said valve seat, so that said fluid passageway is substantially sealed when no offsetting force is present, and said resilient member further being arranged to be susceptible to application of an offsetting force adequate to move said plunger off said valve seat to thereby open said fluid passageway.

13. The valve element as recited in claim 12, wherein said terminal tip of said plunger is configured to mate with a corresponding terminal tip of a plunger of a second valve element to provide said offsetting force.

14. The valve element as recited in claim 13, wherein said terminal tip includes a female member configured to engage a correspondingly shaped male member of a terminal tip of said second valve element.

15. The valve element as recited in claim 13, wherein said terminal tip includes a male member configured to engage a correspondingly shaped female member of a terminal tip of said second valve element.

16. The valve element as recited in claim 12, wherein said plunger shaft is substantially hexagonal, and said plunger guide is substantially circular.

17. The valve element as recited in claim 12, wherein said housing is a first housing and said plunger is a first plunger, and wherein said resilient member is configured to receive an offsetting force from a second plunger disposed within a second housing, and wherein said first plunger and said second plunger are different, yet interchangeable.

* * * * *

UNITED STATES PATENT AND TRADEMARK OFFICE
CERTIFICATE OF CORRECTION

PATENT NO. : 7,686,037 B2  
APPLICATION NO. : 11/465528  
DATED : March 30, 2010  
INVENTOR(S) : Krywitsky Page 1 of 2

It is certified that error appears in the above-identified patent and that said Letters Patent is hereby corrected as shown below:

Face
Item 56, Page 2, Left Hand Column, Line 2, change "HaMilton" to --Hamilton--
Item 56, Page 2, Left Hand Column, Line 8, change "11/1970" to --10/1970--
Item 56, Page 2, Right Hand Column, Line 9, change "Cornford" to --Cornford et al.--

Drawings
Sheet 3, replace Figure 3A with the figure depicted below, wherein "306C" has been relabeled --306A--

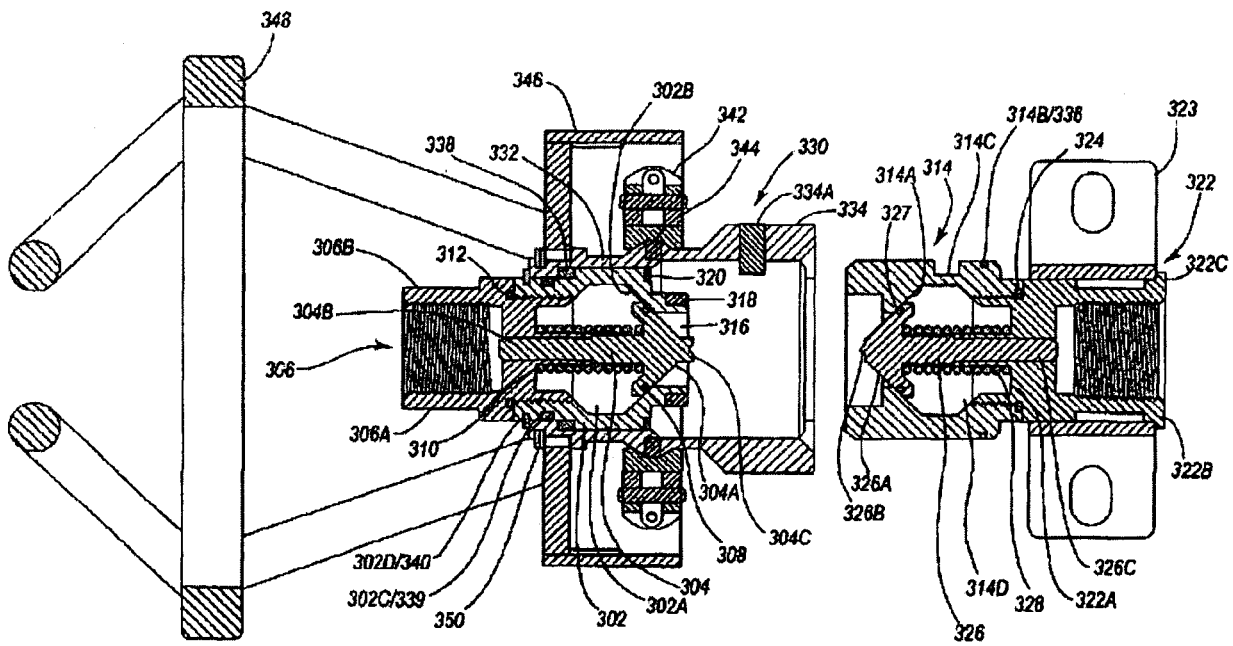

Fig. 3A

Signed and Sealed this
Twelfth Day of February, 2013

Teresa Stanek Rea
*Acting Director of the United States Patent and Trademark Office*

CERTIFICATE OF CORRECTION (continued)
U.S. Pat. No. 7,686,037 B2

Sheet 4, replace Figure 3B with the figure depicted below, wherein "306C" has been changed to --306A--

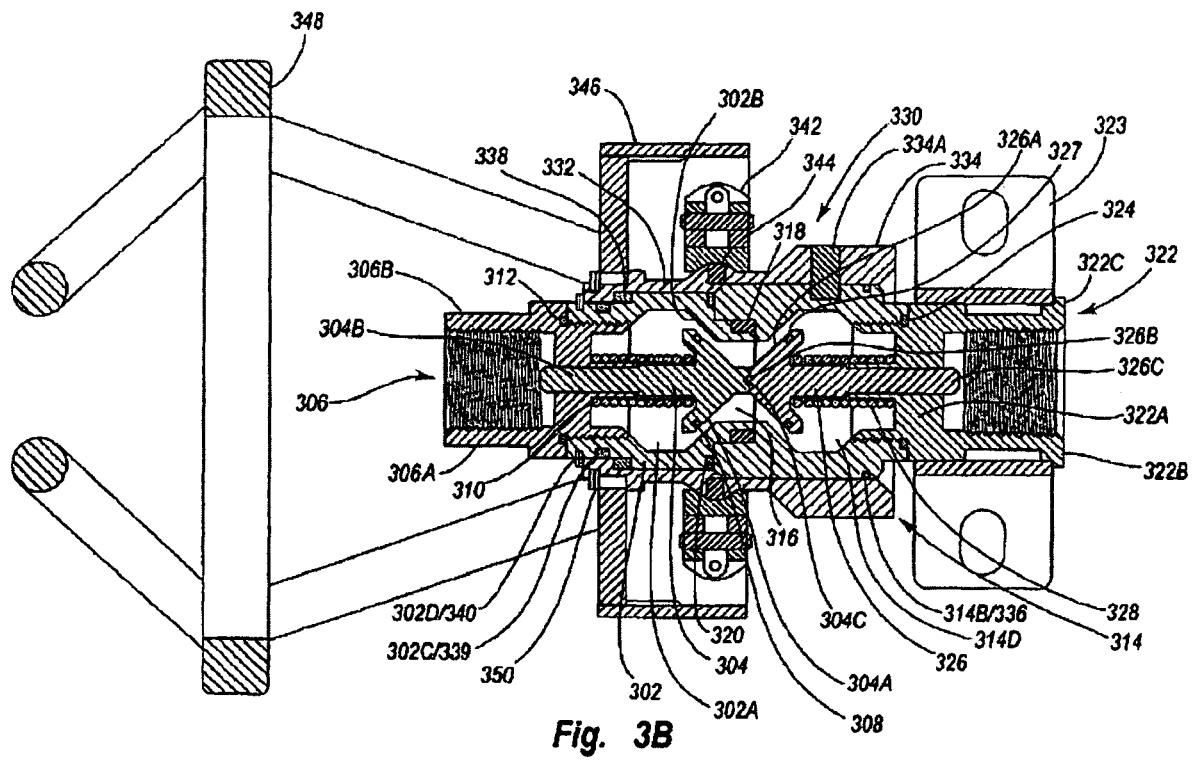

Fig. 3B

Column 4
Line 46, change "denoted generally at 300." to --denoted generally as 300.--
Line 66, after "invention", insert --,--

Column 5
Line 53, change "316" to --316--
Line 61, change "316" to --316--

Column 6
Line 51, change "316" to --316--
Line 61, change "FIG. 1" to --FIG. 2--

Column 9
Lines 13, 22, and 23, change "316" to --316--
Line 54, change "354" to --354--
Line 57, change "slot 352 travel" to --slots 352 travel--